United States Patent
Mohtadi et al.

(10) Patent No.: US 11,450,883 B2
(45) Date of Patent: Sep. 20, 2022

(54) ENHANCED SOLID CLOSO-BORANE ELECTROLYTES FOR BATTERIES

(71) Applicant: Toyota Motor Engineering & Manufacturing North America, Inc., Plano, TX (US)

(72) Inventors: Rana Mohtadi, Northville, MI (US); Oscar Tutusaus, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 259 days.

(21) Appl. No.: 16/917,188

(22) Filed: Jun. 30, 2020

(65) Prior Publication Data

US 2021/0408587 A1  Dec. 30, 2021

(51) Int. Cl.
  *H01M 10/0564* (2010.01)
  *H01M 10/058* (2010.01)
  *H01M 10/0525* (2010.01)

(52) U.S. Cl.
  CPC ..... *H01M 10/0564* (2013.01); *H01M 10/058* (2013.01); *H01M 10/0525* (2013.01); *H01M 2300/0065* (2013.01)

(58) Field of Classification Search
  CPC ......... H01M 10/0564; H01M 10/0525; H01M 10/058; H01M 2300/0065
  See application file for complete search history.

(56) References Cited

U.S. PATENT DOCUMENTS

| | | | |
|---|---|---|---|
| 9,252,458 B2 | 2/2016 | Mohtadi et al. | |
| 9,755,269 B2 | 9/2017 | Casteel, Jr. et al. | |
| 10,553,897 B2 | 2/2020 | Udovic | |
| 2006/0216612 A1 | 9/2006 | Jambunathan et al. | |
| 2007/0072085 A1 | 3/2007 | Chen et al. | |
| 2019/0006714 A1* | 1/2019 | Kano | H01M 10/0525 |
| 2019/0273258 A1* | 9/2019 | Thomas-Alyea | H01M 10/0525 |
| 2021/0300773 A1* | 9/2021 | Nogami | H01M 10/052 |

OTHER PUBLICATIONS

Duchene et al., "A Highly Stable Sodium Solid-State Electrolyte Based on a Dodeca/Deca-Borate Equimolar Mixture," Chem. Commun., 2017, 53, pp. 4195-4198.
Kim, S. et al., "A complex hydride lithium superionic conductor for high-energy-density all-solid-state lithium metal batteries," Nature Communications (2019)10:1081 https://doi.org/10.11038/s41467-019-09061-9, www.nature.com/naturecommunications, pp. 1-9.
Udovic, T. et al., "Sodium Superionic Conduction in Na2B12H12," ChemComm (2014) 4 pages.

(Continued)

*Primary Examiner* — Stewart A Fraser
(74) *Attorney, Agent, or Firm* — Christopher G. Darrow; Darrow Mustafa PC

(57) ABSTRACT

A solid-state electrolyte is presented that is a combined salt of an alkali metal or alkali earth metal closo-borate and alkali metal or alkali earth metal conductivity enhancing anion salt. The combined salt allows significantly higher conductivities in the solid state than the included alkali metal or alkali earth metal closo-borate. The combined salt can be prepared by mechanical combination or combination in solution. The salts can be used in solid-state electrochemical devices.

20 Claims, 2 Drawing Sheets

(56) References Cited

OTHER PUBLICATIONS

Tang, W.S. et al., "Unparalleled Lithium and Sodium Superionic Conduction in Solid Electrolytes with Large Monovalent Cage-like Anions," Energy & Environmental Science (2015) 20 pages.

Tang, W.S. et al., "Stabilizing Superionic-Conducting Structures via Mixed-Anion Solid Solutions of Monocarba-closo-borate Salts," ACS Energy Lett. 2016, 1, pp. 659-664.

Tang. W.S. et al., "Liquid-like Ionic Conduction in Solid Lithium and Sodium Monocarba-closo-decaborates near or at Room Temperature," Advanced Energy Materials, vol. 6, Iss. 8 (Apr. 20, 2016) 23 pages.

Udovic, T.J. et al., "Exceptional Superionic Conductivity in Disordered Sodium Decahydro-closo-decaborate," Adv. Mater. 2014, 26, pp. 7622-7626.

\* cited by examiner

ENHANCED SOLID CLOSO-BORANE ELECTROLYTES FOR BATTERIES

TECHNICAL FIELD

The present disclosure generally relates to electrochemical cells, more particularly, to batteries having electrolytes with boranyl salts.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

There is an increasing demand for batteries where performance exceeds that of typical Li-ion batteries and are safer. To achieve superior energy and power densities, lithium and sodium boron cluster salts are of interest for use as electrolytes in these batteries. Large anion sizes make closo-borates, such as $B_{12}H_{12}^{-2}$, $B_{10}H_{10}^{-2}$, $CB_{11}H_{12}^{-1}$, and $CB_9H_{10}^{-1}$, particularly attractive for solid-state batteries, as these anions display orientation mobility, a dynamic frustration that allows order-disorder phase transitions, which leads to high cation mobility for enhanced ion conduction. Unfortunately, these have room temperature conductivities of less than $10^{-4}$ S/cm and not those greater than $10^{-3}$ S/cm needed for acceptable performance. The smaller anions, such as $B_{10}H_{10}^{-2}$ and $CB_9H_{10}^{-1}$, and nido-borates, such as $B_{11}H_4^{-1}$, are unstable in the high voltage environment of the cathode, where decomposition occurs above 3.6 V Li. Combining the larger closo-borates with the smaller closo-borates and nido-borates appears to increase Li and Na conductivities but fails to improve the stability over that of the smaller anions.

Accordingly, to realize robust and optimally conductive solid-state electrolytes of alkali metal or alkali earth metal closo-borate salts, there remains a need for a composition that enhances conductivities without sacrificing electrochemical stability.

SUMMARY

Disclosed, in various non-limiting embodiments, are electrolytes having a combination of one or more large lithium or sodium closo-borate salts, or other alkali metal or alkali earth metal closo-borate salts, with one or more stable lithium or sodium salts, or other alkali metal or alkali earth metal salts, with a cation conductivity enhancing anion salt that is stable, where the combined anion salt displays high cation mobility and high stability. The closo-borate anions can be $B_{12}H_{12}^{-2}$, $CB_{11}H_{12}^{-1}$, or a substituted derivative thereof. These large alkali metal or alkali earth metal closo-borates have anions of the structure $C_yB_{12-y}H_{12-z}X_z$ where y is 0 or 1, z is 0 to 12, and X is independently halogen, alkyl, alkoxy, acyl, aryl, alkylaryl, arylalkyl, and/or aryloxy substituents and wherein alkyl groups can be linear, branched, or cyclic, and wherein any substituent can be partially or fully fluorinated. The conductivity enhancing anion can be of a simple or complex alkali metal or alkali earth metal salt that is electrochemically stable. The conductivity enhancing anion can be $F^-$, $Cl^-$, $Br^-$, $I^-$, $R_xBF_{4-x}^-$, $R_yPF_{6-y}^-$, $SbF_6^-$, $ClO_4^-$, $SO_4^{-2}$, $N(SO_2F)_2^-$, $N(SO_2(CF_2)_nCF_3)_2^-$, $[NSO_2(CF_2)_{n+1}SO_2]^-$, $CF_3(CF_2)_nSO_3^-$, where n is 0 to 5, x is 0 to 4, y is 0 to 6 and R is a linear, branched, or cyclic alkyl chain that can be unsubstituted, partially fluorinated, or fully fluorinated, or any other anion In one embodiment, provided herein, is a method to prepare an alkali metal or alkali earth metal closo-borate/conductivity enhancing anion salts as an effectively solvent-free combined salt. The component salts are mixed in solution and the solvent is removed by heating to yield the effectively solvent-free alkali metal or alkali earth metal closo-borate/conductivity enhancing anion salts. The mole fraction of the conductivity enhancing anion to the total anions in the combined salt can be 0.01 to 0.9 in the combined salt.

In one embodiment, provided herein, a method to prepare a mixed alkali metal or alkali earth metal closo-borate/conductivity enhancing anion salts, as an effectively solvent-free combined salt, is carried out in a mechanical synthesis. In the mechanical synthesis, the solid alkali metal or alkali earth metal closo-borate is combined with a solid alkali metal or alkali earth metal conductivity enhancing anion salt. A mechanical shear is placed on the interface between the salts such that a powder of the combined salts is formed. An auxiliary solvent can be combined with the solids to enhance mixing, where the solvent can be a poor solvent or a good solvent for the salts and the proportion of solvent to salt can be selected to enhance mixing of the semi-solid paste. Upon effective mixing, any solvent can be removed from the combined salt by heating. The molar ratio of the conductivity enhancing anion to the closo-borate can be 0.01 to 0.9 in the combined salt.

In one embodiment, provided herein, the mixed alkali metal or alkali earth metal closo-borate conductivity enhancing anion salt is a solid-state electrolyte for a solid-state electrochemical device. Accordingly, provided herein, is an electrochemical device that includes an anode; a cathode; and a solid-state electrolyte that is the mixed alkali metal or alkali earth metal closo-borate/conductivity enhancing anion salt in contact with the anode and the cathode. The electrochemical device can be a secondary battery or a subunit of a secondary battery. The anode is an electrode where alkali metal or alkali earth metal oxidation occurs during the device's discharge and at which reduction occurs during the device's charge. Similarly, the cathode is an electrode where a cathode material reduction occurs during the device's discharge and a cathode material oxidation occurs during the device's charge.

These and other features of the combined salt electrolyte and its preparation will become apparent from the following detailed description when read in conjunction with the figures and examples, which are exemplary, not limiting.

BRIEF DESCRIPTION OF THE DRAWINGS

For a better understanding of the processes and devices having a combined salt electrolyte, with regard to the particular variations and examples discussed herein, reference is made to the accompanying figures, in which.

Figure 1:
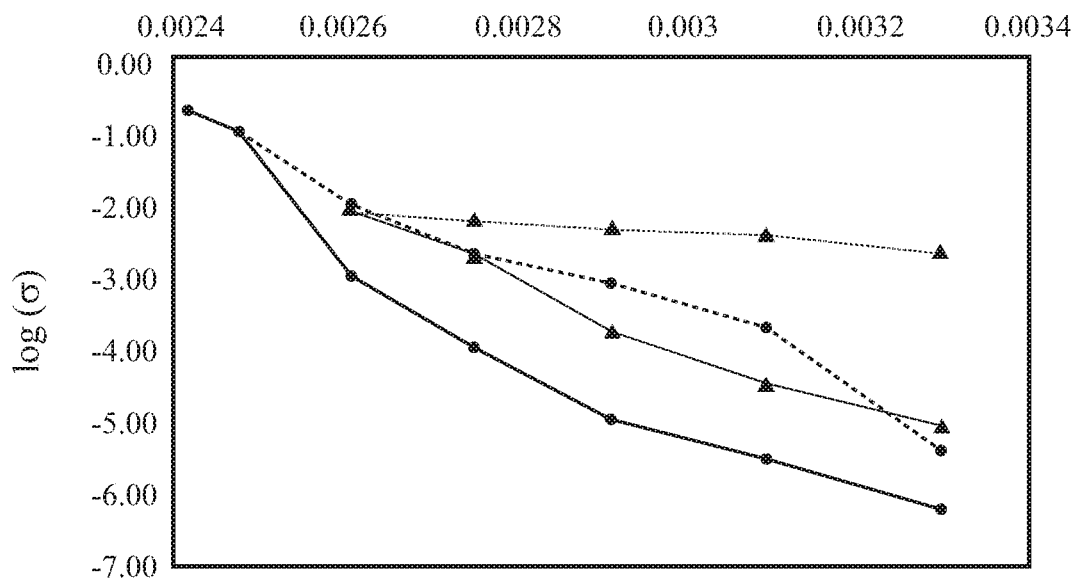
FIG. 1 shows a plot of the conductivity of a 1:1 combination of $Li_2[CB_{11}H_{12}][BF_4]$, where the combined salt's conductivity (▲) displays a higher conductivity during heating (solid line) and cooling (dashed line) than $Li[CB_{11}H_{12}]$ (●) at temperatures below 100° C.

It should be noted that the figures set forth herein are intended to exemplify the general characteristics of the methods, algorithms, and devices among those of the present technology, for the purpose of the description of certain aspects. The figures may not precisely reflect the characteristics of any given aspect and are not necessarily intended to define or limit specific embodiments within the scope of this technology.

DETAILED DESCRIPTION

The present disclosure provides electrolytes for a solid-state electrochemical device, such as a solid-state battery, where the electrolyte includes at least one alkali metal or alkali earth metal closo-borate combined with at least one alkali metal or alkali earth metal conductivity enhancing anion salt, where the identity of the alkali metal or alkali earth metal is common to all salts in the combination. The alkali metal or alkali earth metal is Li, Na, K, Rb, Cs, Be, Mg, Ca, or Sr. The alkali metal or alkali earth metal closo-borate combined with an alkali metal or alkali earth metal conductivity enhancing anion salt can include the alkali metal lithium or sodium. The conductivity enhancing anion can be $F^-$, $Cl^-$, $Br^-$, $I^-$, $R_xBF_{4-x}^-$, $R_yPF_{6-y}^-$, $SbF_6^-$, $ClO_4^-$, $SO_4^{-2}$, $N(SO_2F)_2^-$, $N(SO_2(CF_2)_nCF_3)_2^-$, $[NSO_2(CF_2)_{n+1}SO_2]^-$, $CF_3(CF_2)_nSO_3^-$, where n is 0 to 5, x is 0 to 4, y is 0 to 6 and R is a linear, branched, or cyclic alkyl chain that can be unsubstituted, partially fluorinated, or fully fluorinated, any combination thereof, or any other anion. The electrolyte is prepared by effectively mixing one or more closo-borate salts and one or more conductivity enhancing anion salts to form the combined anion salts paired with a common or a different cation where the proportions of the anions are controlled by the relative quantities of the salts combined.

The present disclosure provides a method to prepare electrolytes for a solid-state electrochemical device, where the electrolyte is an at least one alkali metal or alkali earth metal closo-borate combined with at least one alkali metal or alkali earth metal conductivity enhancing anion salt where all salts have a common or different cation. The method allows the alkali metal or alkali earth metal closo-borate and alkali metal or alkali earth metal conductivity enhancing anion salts to be combined in solution, in a slurry, or in the solid-state. The proportion of the conductivity enhancing anions and closo-borates can be selected where the mole fraction of the conductivity enhancing anion is from about 0.01 to about 0.9.

In one embodiment, the alkali metal or alkali earth metal closo-borate and alkali metal or alkali earth metal conductivity enhancing anion salts are combined by the mixing of particulate solids, which are then mechanically milled to yield a combined salt where the salts are combined as mixed small particles, where the particulate form can be provided with dimensions at the micrometer or nanometer level. Ball milling, jet milling, and other milling techniques can produce nanoparticles less than 500 nm. Heat can be applied to melt and fuse the salts to produce the combined salts into a single combined lattice or solid solution rather than crystallites of different salts. The form of the combined salts can be as a powder, solid sheet or film, which can be molded or otherwise shaped as desired. Temperatures that are employed can be up to or more than 250° C., but generally below a temperature where an undesired transformation occurs, such as decomposition of the combined salts. The anions can be selected to retain their structure, or the structure of the closo-borate and/or the conductivity enhancing anion can be modified by various exchange or other processes during combination. The combination can result in multiple anions that are not present in the mixtures combined. The blending of the alkali metal or alkali earth metal closo-borate and alkali metal or alkali earth metal conductivity enhancing anion salts can be aided by the formation of a slurry with a solvent where a portion of the salt mixture is in solution. The solvent can be selected from aprotic solvents including alkanes, aromatic hydrocarbons, amines, phosphines, ethers, and thioethers, generally with a boiling point below 250° C. The solvent can be removed by heating with or without imposing a reduced pressure during removal.

In one embodiment, the alkali metal or alkali earth metal closo-borate and alkali metal or alkali earth metal conductivity enhancing anion salts are placed into solution for their combination. All salts can be combined, and a solvent or mixed solvent can be introduced to dissolve all salts. Alternatively, one or more salts can be dissolved in a first solvent, which can be a mixed solvent, to form a first solution that is mixed with a second solution having other of the salts dissolved in a second solvent, which can be a mixed solvent and can be the same or different than the first solvent. The solvent(s) can be selected from alkanes, aromatic hydrocarbons, amines, phosphines, ethers, and thioethers, generally with a boiling point below 250° C. The solvents can be removed by heating with or without imposing a reduced pressure during removal to evaporate the one or more solvents employed for dissolving, combining, and mixing the combined salts. Heating can occur with warming the combined salts in any warming profile to an ultimate temperature where the salt can melt at a temperature imposed during the heating for removal of the solvent. The structure of one or more anions can be transformed during the mixing and/or isolating processes such that the number of different anions present in the final combined alkali earth metal closo-borate and conductivity enhancing anion salts can be greater than the number provided for combining during the process. The solutions or the salts and the solvents can be combined using a mechanical stirrer, an inline stirrer.

After removal of the at least one solvent by heating the combined salts a solid mass ultimately forms before or after discontinuing heating. Evaporation of the solvent can be continued until the level of solvent remaining in the consolidated mass of combined salt is less than one mole percent relative to the alkali metal or alkali earth metal cation, which is a level where the combined salt is considered essentially free of solvent for use as a solid-state electrolyte.

The anions of the closo-borate salts can be $B_{12}H_{12}^{-2}$, $CB_{11}H_{12}^{-1}$, or a substituted derivative thereof. These closo-borate anions have the structure $C_yB_{12-y}H_{12-z}X_z^{-(2-y)}$ where y is 0 or 1, z is 0 to 12, and X is independently halogen, alkyl, alkoxy, acyl, aryl, alkylaryl, arylalkyl, and/or aryloxy substituents and wherein alkyl groups can be linear, branched, or cyclic and wherein any substituent can be partially or fully fluorinated. The halogen can be F, Cl, Br, or I. The conductivity enhancing anion can be of a simple or complex alkali metal or alkali earth metal salt that is electrochemically stable. The alkali metal or alkali earth metal closo-borate can have Li, Na, K, Rb, Cs, Be, Mg, Ca, or Sr as the metal cation. In one embodiment, the alkali metal is lithium. The conductivity enhancing anion can be: an anion known to have rotator motion, for example, $ClO_4^-$, $SO_4^{-2}$, or $CF_3SO_3^-$; a complex halide anion, for example, $PF_6^-$, $BF_4^-$, $R_xBF_{4-x}^-$, or $R_yPF_{6-y}^-$, where x is 0 to 4, y is 0 to 6 and R is a linear, branched, or cyclic alkyl chain that can be unsubstituted, partially fluorinated, or fully fluorinated; an imido anion, for example, $N(SO_2F)_2^-$, $N(SO_2(CF_2)_nCF_3)_2^-$ where n is 1 to 5; a cyclo-imido, for example, $[NSO_2(CF_2)_{n+1}SO_2]^-$ where n is 1 to 5; or a simple anion, for example, $F^-$, $Cl^-$, $Br^-$, or $I^-$. The conductivity enhancing anion can be oligomeric, for example, a perfluorinated sulfate of the structure $CF_3(CF_2)SO_3^-$ where n is 1 to 5 and the oligomer can be a combination of different homologues or a single homologue. Other anions that display rotator motion, are complex halides, or imidos may be employed as the one or more second anion.

The solvent-free combined alkali metal or alkali earth metal closo-borate and alkali metal or alkali earth metal conductivity enhancing anion salts can be a solid electrolyte that can be used in an electrochemical device. The electrochemical device can be a secondary battery or a subunit of a secondary battery. The anode is an electrode where alkali metal or alkali earth metal oxidation occurs during the device's discharge and at which alkali metal or alkali earth metal reduction occurs during the device's charge. Similarly, the cathode is an electrode where a cathode material reduction occurs during the device's discharge and a cathode material oxidation occurs during the device's charge.

The anode can include any material or combination of materials effective to participate in electrochemical oxidation of the alkali metal or alkali earth metal during the device's discharge. Similarly, the anode can include any material or combination of materials effective to participate in electrochemical reduction of the alkali metal or alkali earth metal cations and to incorporate reduced alkali metal or alkali earth metal during a device's charge. In certain embodiments, the anode can consist essentially of elemental alkali metal or alkali earth metal or include at least one surface layer of elemental alkali metal of alkali earth metal. The anode can also include insertions, such as carbon, or oxides), alloys, such as Si or Sn, and conversion anodes with nano-sized transition metal oxides, fluorides or phosphides The cathode can include any material or combination of materials that undergoes electrochemical insertion of a cathode material during the device's discharge. Similarly, the cathode can include any material or combination of materials for electrochemical extraction of the cathode material during the device's charge. In some variations, the cathode material that is inserted at the cathode during a device discharge and extracted from the cathode during device charging event can include the alkali metal of alkali earth metal.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Figure 2:
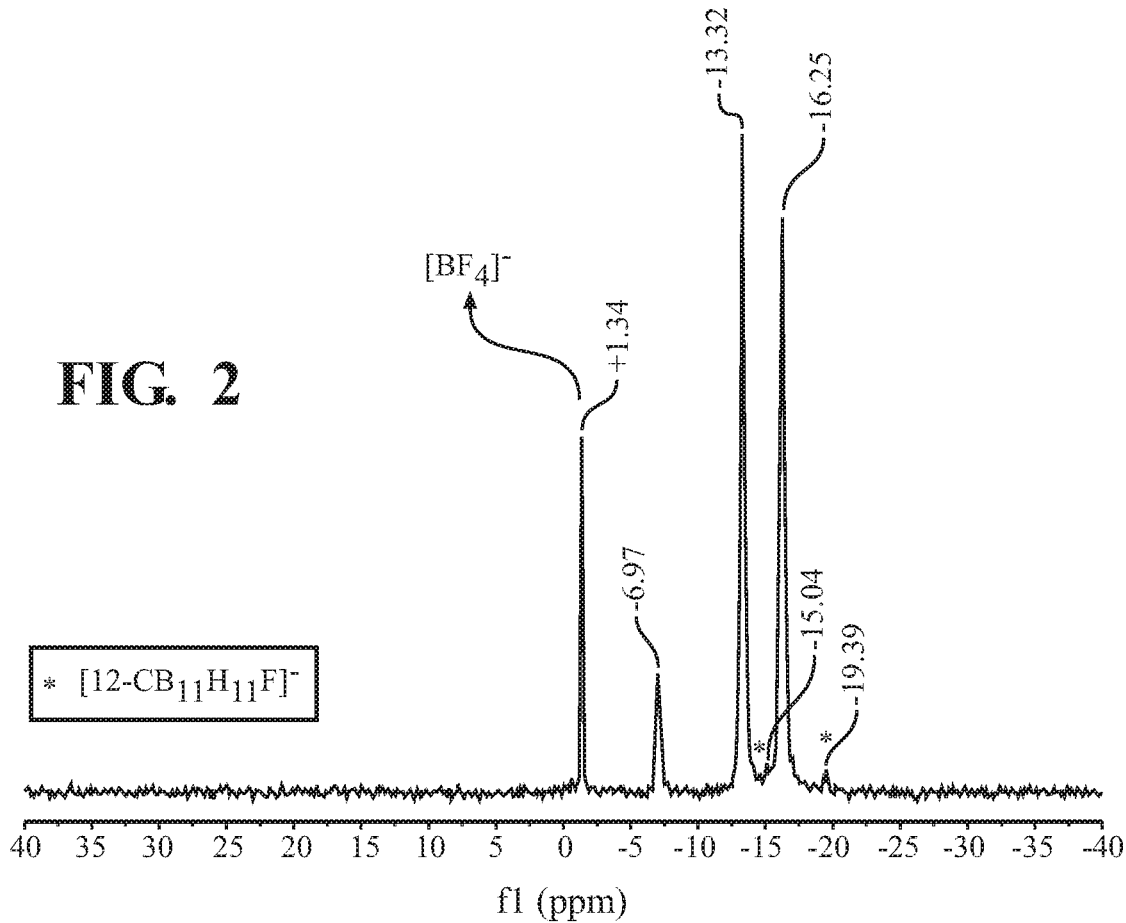
FIG. 2 shows a $^{10}B$ NMR spectrum of the 1:1 combination of $Li_2[CB_{11}H_{12}][BF_4]$ of FIG. 1, where approximately 4 mol % $Li[CB_{11}H_{11}F]$ is indicated in the spectrum.

Example 1. Preparation of $Li_2[CB_{11}H_{12}][BF_4]$ $LiCB_{11}H_{12}$ was combined with $LiBF_4$ in a mortar at a 1:1 molar ratio. The combined salts were ground with a pestle and transferred to a ball mill where they were milled at 700 rpm for 24 hours. Conductivity was measured for the milled $Li_2[CB_{11}H_{12}][BF_4]$ and the $LiCB_{11}H_{12}$ precursor. Conductivity results are shown in FIG. 1. The conductivities below 100° C. are significantly greater for the combined salt than of the starting closo-borate salt. On the cooling cycle, the conductivities were greater than $2\times10^{-3}$ S/cm at about normal room temperature and above. The $^{10}B$ NMR spectrum, shown in FIG. 2, indicate that during preparation, a reaction between both anions occurred to form about four mole percent of a fluorinated closo-borate anion.

Figure 3:
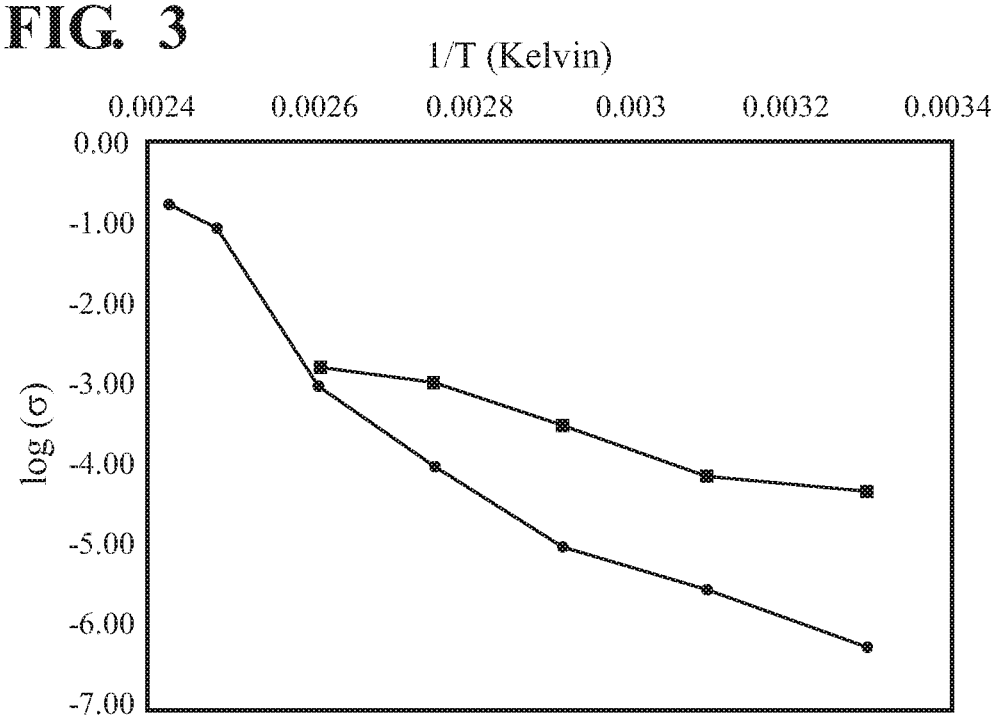
FIG. 3 shows a plot of the conductivity of a 1:1 combination of $Li_2[CB_{11}H_{12}][PF_6]$, where the combined salt's conductivity (■) displays a higher conductivity than $Li[CB_{11}H_{12}]$ (●) at temperatures below 100° C.
Figure 4:
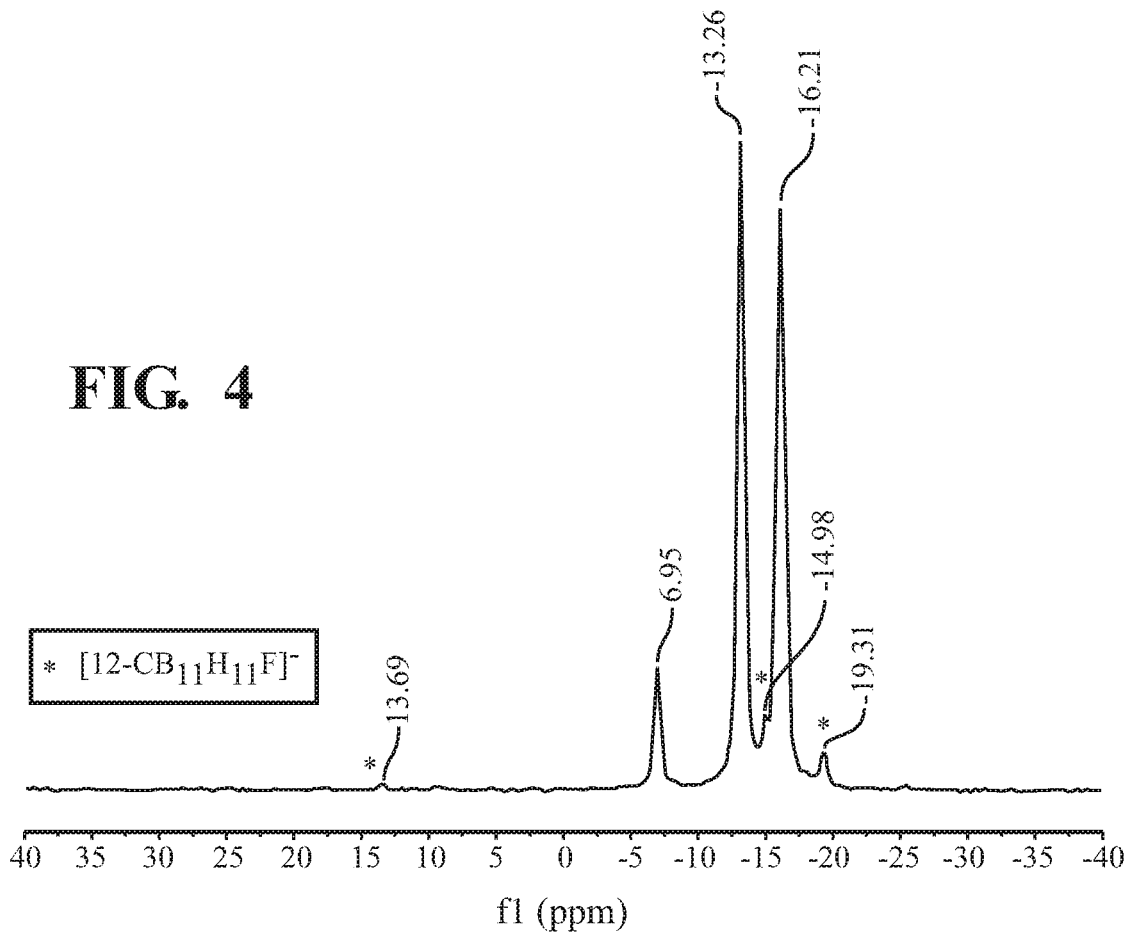
FIG. 4 shows a $^{10}B$ NMR spectrum of the 1:1 combination of $Li_2[CB_{11}H_{12}][PF_6]$ of FIG. 3, where approximately 6 mol % $Li[CB_{11}H_{11}F]$ is indicated in the spectrum.

Example 2. Preparation of $Li_2[CB_{11}H_{12}][PF_6]$ $LiCB_{11}H_{12}$ was combined with $LiPF_6$ in a mortar at a 1:1 molar ratio. The combined salts were ground with a pestle and transferred to a ball mill where they were milled at 700 rpm for 24 hours. Conductivity was measured for the milled $Li_2[CB_{11}H_{12}][BF_4]$ and the $LiCB_{11}H_{12}$ precursor. Conductivity results are shown in FIG. 3. The conductivities below 100° C. are significantly greater for the combined salt than of the starting closo-borate salt. The $^{10}B$ NMR spectrum, shown in FIG. 4, indicate that during preparation, a reaction between both anions occurred to form about six mole percent of a fluorinated closo-borate anion.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A solid-state electrolyte comprising:
   a combined salt consisting of:
   at least one alkali metal or alkali earth metal closo-borate salt, where an anion of the closo-borate salt has the structure:

$C_yB_{12-y}H_{12-z}X_z^{-(2-y)}$ where y is 0 or 1, z is 0 to 12, and X is independently halogen, alkyl, alkoxy, acyl, aryl, alkylaryl, arylalkyl, and/or aryloxy substituents where the alkyl can be linear, branched, or cyclic, and wherein any substituent is unsubstituted, partially fluorinated, or fully fluorinated; and
   at least one alkali metal or an alkali earth metal conductivity enhancing anion salt, where an anion of the conductivity enhancing salt is selected from F$^-$, Cl$^-$, Br$^-$, I$^-$, R$_x$BF$_{4-x}^-$, R$_y$PF$_{6-y}^-$, SbF$_6^-$, ClO$_4^-$, SO$_4^{-2}$, N(SO$_2$F)$_2^-$, N(SO$_2$(CF$_2$)$_n$CF$_3$)$_2^-$, [NSO$_2$(CF$_2$)$_{n+1}$SO$_2$]$^-$, CF$_3$(CF$_2$)$_n$SO$_3^-$, where n is 0 to 5, x is 0 to 4, y is 0 to 6 and R is a linear, branched, or cyclic alkyl chain that can be unsubstituted, partially fluorinated, or fully fluorinated, or any combination thereof, and wherein the combined salt is free of a solvent.

2. The solid-state electrolyte according to claim 1, wherein the alkali metal or alkali earth metal of the combined salt is Li, Na, K, Rb, Cs, Be, Mg, Ca, or Sr.

3. The solid-state electrolyte according to claim 1, wherein the alkali metal of the combined salt is lithium.

4. The solid-state electrolyte according to claim 1, wherein the at least one alkali metal or an alkali earth metal conductivity enhancing anion salt in the combined salt has a mole fraction of about 0.01 to about 0.9.

5. The solid-state electrolyte according to claim 1, wherein the combined salt is a particulate solid.

6. The solid-state electrolyte according to claim 5, wherein the particulate solid is of nanometer or micrometer dimensions.

7. The solid-state electrolyte according to claim 1, wherein the combined salt is a solid sheet or film.

8. A process for preparing a solid-state electrolyte, comprising:
   providing at least one alkali metal or alkali earth metal closo-borate salt, where an anion of the closo-borate salt has the structure:

$C_yB_{12-y}H_{12-z}X_z^{-(2-y)}$, where y is 0 or 1, z is 0 to 12, and X is independently halogen, alkyl, alkoxy, acyl, aryl, alkylaryl, arylalkyl, and/or aryloxy substituents where the alkyl can be linear, branched, or cyclic, and wherein any substituent is unsubstituted, partially fluorinated, or fully fluorinated;
   providing at least one alkali metal or an alkali earth metal conductivity enhancing anion salt, where an anion of the conductivity enhancing salt is selected from F$^-$, Cl$^-$, Br$^-$, I$^-$, R$_x$BF$_{4-x}^-$, R$_y$PF$_{6-y}^-$, SbF$_6^-$, ClO$_4^-$, SO$_4^{-2}$, N(SO$_2$F)$_2^-$, N(SO$_2$(CF$_2$)$_n$CF$_3$)$_2^-$, [NSO$_2$(CF$_2$)$_{n+1}$SO$_2$]$^-$, CF$_3$(CF$_2$)$_n$SO$_3^-$, where n is 0 to 5, x is 0 to 4, y is 0 to 6 and R is a linear, branched, or cyclic alkyl chain that can be unsubstituted, partially fluorinated, or fully fluorinated;
   combining the at least one alkali metal or alkali earth metal closo-borate salt and the at least one alkali metal or an alkali earth metal conductivity enhancing anion salt; and
   mixing the at least one alkali metal or alkali earth metal closo-borate salt and the at least one alkali metal or an alkali earth metal conductivity enhancing anion salt to form a combined salt for a solid-state electrolyte.

9. The process according to claim 8, wherein the alkali metal or alkali earth metal of the combined salt is Li, Na, K, Rb, Cs, Be, Mg, Ca, or Sr.

10. The process according to claim 8, wherein the at least one alkali metal or an alkali earth metal conductivity enhancing anion salt in the combined salt has a mole fraction of about 0.01 to about 0.9.

11. The process according to claim 8, wherein mixing comprises mechanochemical milling synthesis.

12. The process according to claim 8, further comprising:
    providing at least one solvent;
    combining the at least one solvent, the at least one alkali metal or alkali earth metal closo-borate salt, and the at least one alkali metal or an alkali earth metal conductivity enhancing anion salt; and
    removing the at least one solvent.

13. The process according to claim 12, wherein the at least one solvent comprises an amine, phosphine, ether, thioether, aromatic hydrocarbon, aliphatic hydrocarbon arylhalides, and/or alkylhalides.

14. The process according to claim 12, wherein mixing is milling of a slurry formed by combining the at least one solvent, the at least one alkali metal or alkali earth metal closo-borate salt, and the at least one alkali metal or an alkali earth metal conductivity enhancing anion salt.

15. The process according to claim 12, wherein mixing is stirring of a solution formed by combining the at least one solvent, the at least one alkali metal or alkali earth metal closo-borate salt, and the at least one alkali metal or an alkali earth metal conductivity enhancing anion salt.

16. The process according to claim 12, wherein removing comprises evaporating the at least one solvent by heating.

17. The process according to claim 16, wherein evaporating comprises heating at a reduced pressure lower than one atmosphere.

18. An electrochemical device, comprising:
    a solid electrolyte comprising:
    a combined salt consisting of:
    at least one alkali metal or alkali earth metal closo-borate salt, where an anion of the closo-borate salt has the structure:

$C_yB_{12-y}H_{12-z}X_z^{-(2-y)}$ where y is 0 or 1, z is 0 to 12, and X is independently halogen, alkyl, alkoxy, acyl, aryl, alkylaryl, arylalkyl, and/or aryloxy substituents where the alkyl can be linear, branched, or cyclic, and wherein any substituent is unsubstituted, partially fluorinated, or fully fluorinated; and at least one alkali metal or an alkali earth metal conductivity enhancing anion salt, where an anion of the conductivity enhancing salt is selected from $F^-$, $Cl^-$, $Br^-$, $I^-$, $R_xBF_{4-x}^-$, $R_yPF_{6-y}^-$, $SbF_6^-$, $ClO_4$, $SO_4^{-2}$, $N(SO_2F)_2^-$, $N(SO_2(CF_2)_nCF_3)_2^-$, $[NSO_2(CF_2)_{n+1}SO_2]^-$, $CF_3(CF_2)_nSO_3^-$, where n is 0 to 5, x is 0 to 4, y is 0 to 6 and R is a linear, branched, or cyclic alkyl chain that can be unsubstituted, partially fluorinated, or fully fluorinated, and wherein the combined salt is free of a solvent;

an anode comprising an alkali metal or alkali earth metal of equal atomic number as the cation of the alkali metal or alkali earth metal closo-borate; and a cathode, and wherein the solid electrolyte is free of water and has less than one mole percent of an organic solvent relative to the alkali metal or alkali earth metal closo-borate.

19. The electrochemical device according to claim 18, wherein the alkali metal or alkali earth metal of the combined salt is Li, Na, K, Rb, Cs, Be, Mg, Ca, or Sr, and wherein the at least one alkali metal or an alkali earth metal conductivity enhancing anion salt in the combined salt has a mole fraction of about 0.01 to about 0.9.

20. The electrochemical device according to claim 18, wherein the anode comprises a metallic, an insertion, alloy, or conversion anode.

* * * * *